(12) United States Patent
Balevi et al.

(10) Patent No.: US 12,035,286 B2
(45) Date of Patent: Jul. 9, 2024

(54) GRADIENT ACCUMULATION FOR FEDERATED LEARNING

(71) Applicant: QUALCOMM Incorporated, San Diego, CA (US)

(72) Inventors: Eren Balevi, San Diego, CA (US); Taesang Yoo, San Diego, CA (US); Tao Luo, San Diego, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 17/648,117

(22) Filed: Jan. 14, 2022

(65) Prior Publication Data

US 2023/0232377 A1    Jul. 20, 2023

(51) Int. Cl.
*H04W 72/04* (2023.01)
*G06N 20/00* (2019.01)
*H04W 24/02* (2009.01)
*H04W 72/044* (2023.01)

(52) U.S. Cl.
CPC .......... *H04W 72/044* (2013.01); *G06N 20/00* (2019.01); *H04W 24/02* (2013.01)

(58) Field of Classification Search
None
See application file for complete search history.

(56) References Cited

U.S. PATENT DOCUMENTS

| | | | |
|---|---|---|---|
| 2021/0084505 A1* | 3/2021 | Yoon | H04W 24/08 |
| 2022/0114616 A1* | 4/2022 | Ingram | G06Q 30/0246 |
| 2024/0064611 A1* | 2/2024 | Xu | H04L 9/00 |

* cited by examiner

*Primary Examiner* — Eunsook Choi
(74) *Attorney, Agent, or Firm* — Procopio, Cory, Hargreaves & Savitch LLP

(57) ABSTRACT

A UE may identify, in each round other than an initial round, a first plurality of local model update elements of a present round. The first plurality of local model update elements of the present round may be associated with an updated local machine learning model. The UE may transmit to a base station, in each round other than the initial round, over a multiple access channel via analog signaling, a second plurality of local model update elements of the present round based on a third plurality of local model update elements of the present round. The third plurality of local model update elements of the present round may correspond to a sum of the first plurality of local model update elements of the present round and a local model update error of a previous round immediately before the present round. The analog signaling may be associated with OTA aggregation.

30 Claims, 12 Drawing Sheets

GRADIENT ACCUMULATION FOR FEDERATED LEARNING

TECHNICAL FIELD

The present disclosure relates generally to communication systems, and more particularly, to a federated learning with over-the-air (OTA) aggregation in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may identify, in each round other than an initial round, a first plurality of local model update elements of a present round. The first plurality of local model update elements of the present round may be associated with an updated local machine learning model. The updated local machine learning model may have been generated based on a global machine learning model received from a base station and a local dataset. The apparatus may transmit, in each round other than the initial round, to the base station over a multiple access channel via analog signaling, a second plurality of local model update elements of the present round based on a third plurality of local model update elements of the present round. The third plurality of local model update elements of the present round may correspond to a sum of the first plurality of local model update elements of the present round and a local model update error of a previous round immediately before the present round. The analog signaling may be associated with OTA aggregation.

In an aspect of the disclosure, a method, a computer-readable medium, and an apparatus are provided. The apparatus may be a base station. The apparatus may receive, in each round other than an initial round, from at least one UE over a multiple access channel via analog signaling, a second plurality of local model update elements of a present round based on a third plurality of local model update elements of the present round. The third plurality of local model update elements of the present round may correspond to a sum of a first plurality of local model update elements of the present round and a local model update error of a previous round immediately before the present round. The first plurality of local model update elements of the present round may be associated with an updated local machine learning model. The updated local machine learning model may be based on a global machine learning model from the base station and a local dataset of the at least one UE. The analog signaling may be associated with OTA aggregation. The apparatus may update, in each round other than the initial round, the global machine learning model based on the received second plurality of local model update elements of the present round.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
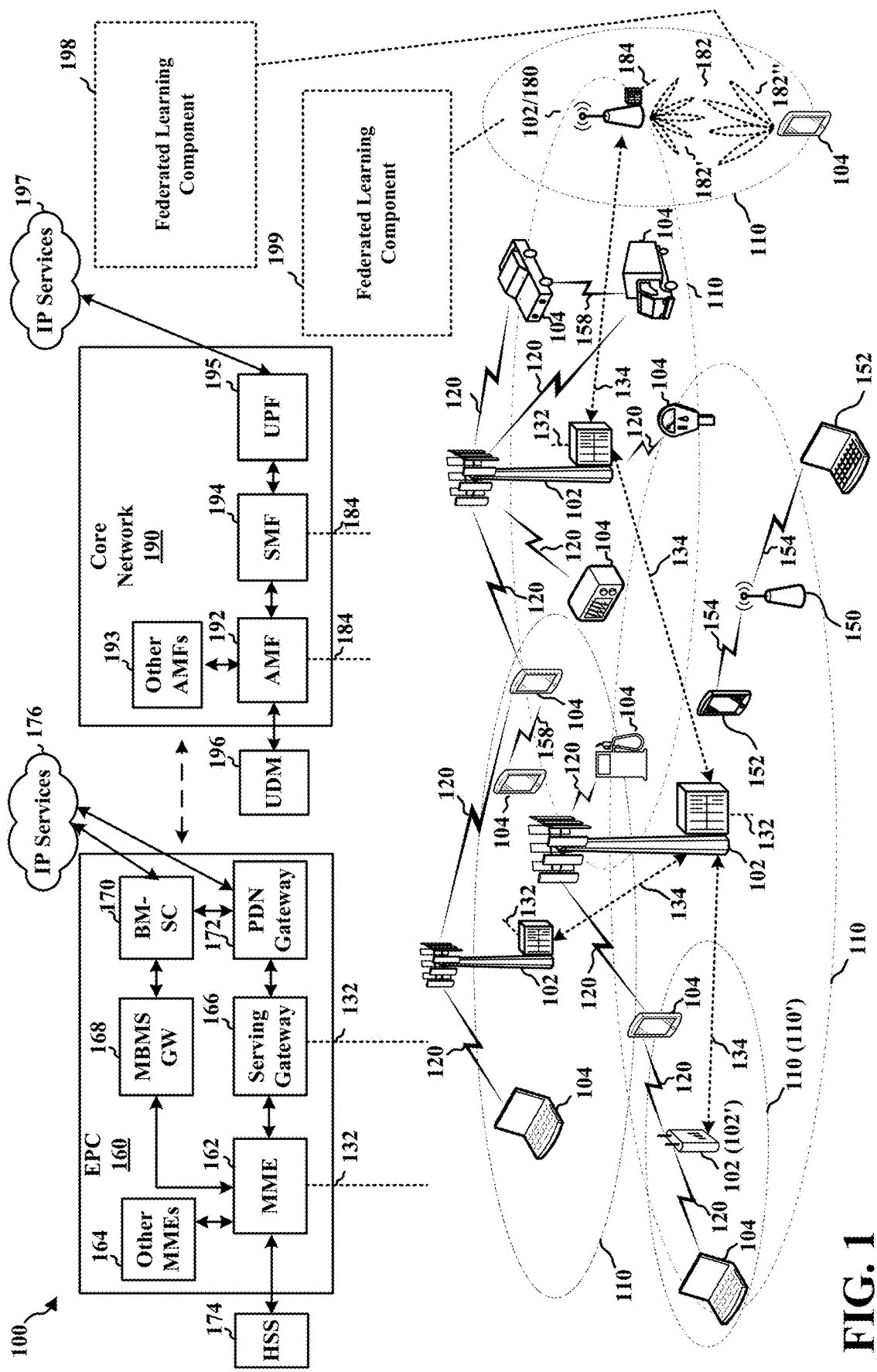
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a federated learning component 198 that may be configured to identify, in each round other than an initial round, a first plurality of local model update elements of a present round. The first plurality of local model update elements of the present round may be associated with an updated local machine learning model. The updated local machine learning model may have been generated based on a global machine learning model received from a base station and a local dataset. The federated learning component 198 may be configured to transmit, in each round other than the initial round, to the base station over a multiple access channel via analog signaling, a second plurality of local model update elements of the present round based on a third plurality of local model update elements of the present round. The third plurality of local model update elements of the present round may correspond to a sum of the first plurality of local model update elements of the present round and a local model update error of a previous round immediately before the present round. The analog signaling may be associated with OTA aggregation. In certain aspects, the base station 180 may include a federated learning component 199 that may be configured to receive, in each round other than an initial round, from at least one UE over a multiple access channel via analog signaling, a second plurality of local model update elements of a present round based on a third plurality of local model update elements of the present round. The third plurality of local model update elements of the present round may correspond to a sum of a first plurality of local model update elements of the present round and a local model update error of a previous round immediately before the present round. The first plurality of local model update elements of the present round may be associated with an updated local machine learning model. The updated local machine learning model may be based on a global machine learning model from the base station and a local dataset of the at least one UE. The analog signaling may be associated with OTA aggregation. The federated learning component 199 may update, in each round other than the initial round, the global machine learning model based on the received second plurality of local model update elements of the present round. Although the following description may be focused on 5G NR, the concepts described herein may be applicable to other similar areas, such as LTE, LTE-A, CDMA, GSM, and other wireless technologies.

Figure 2:
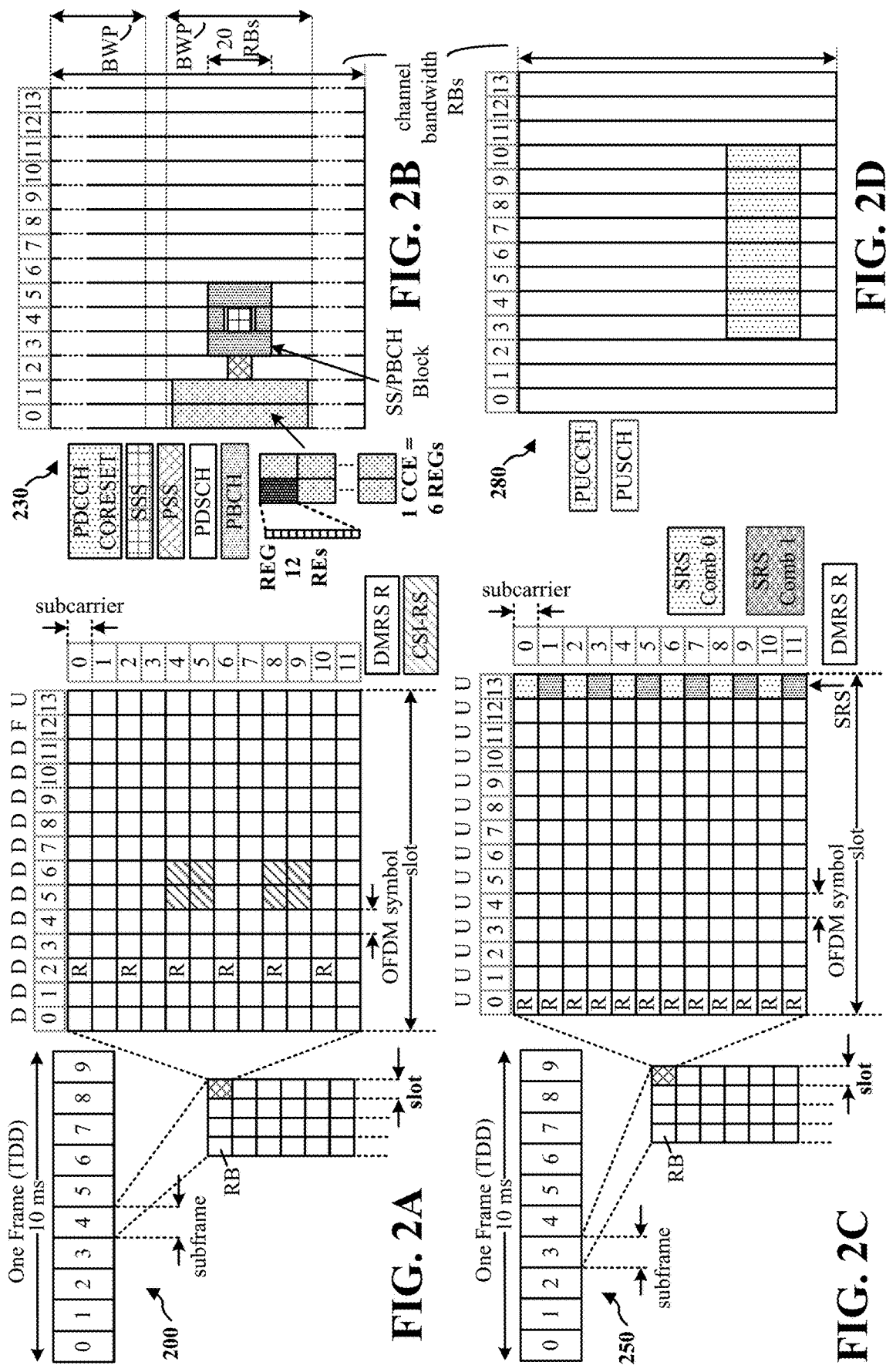
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
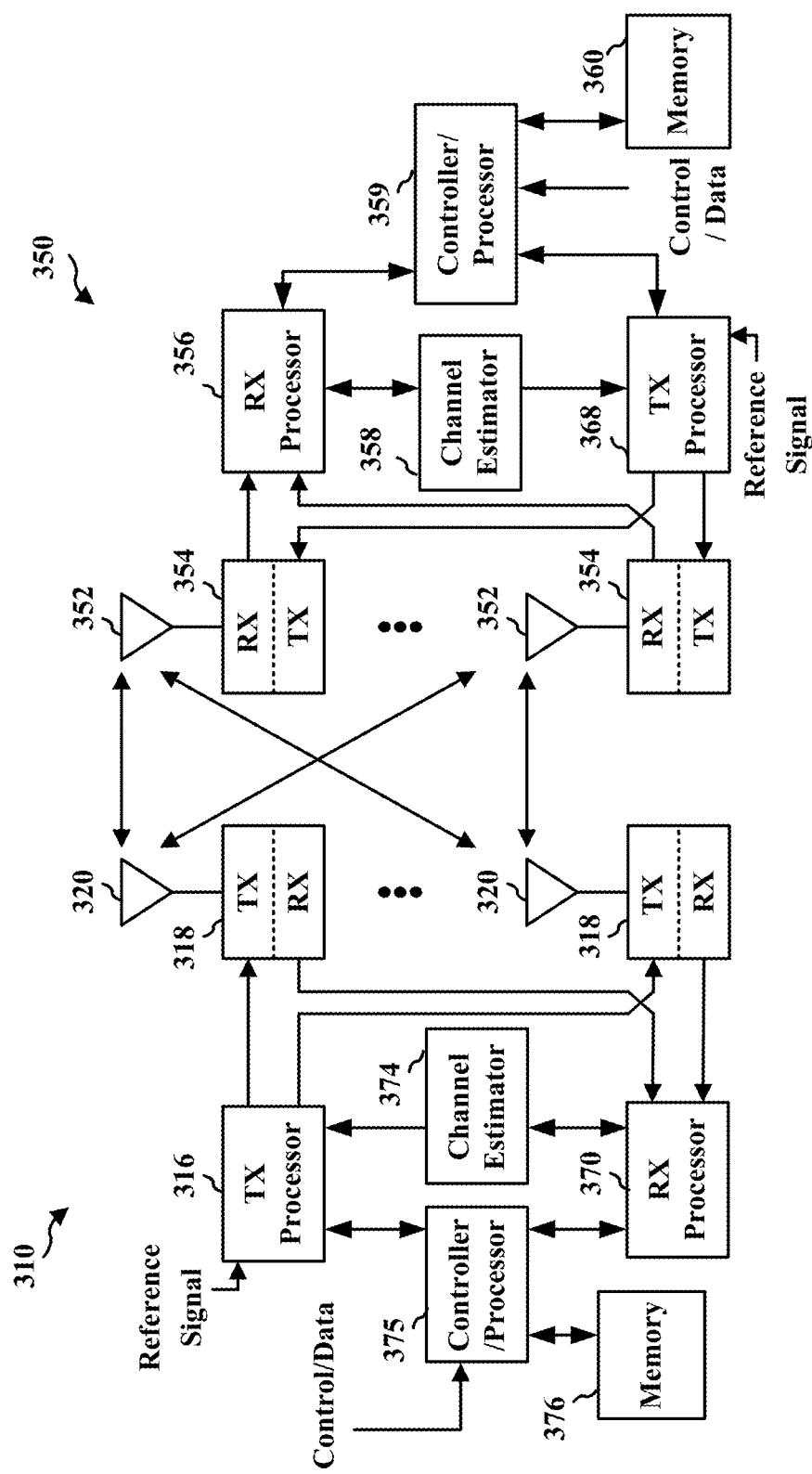
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
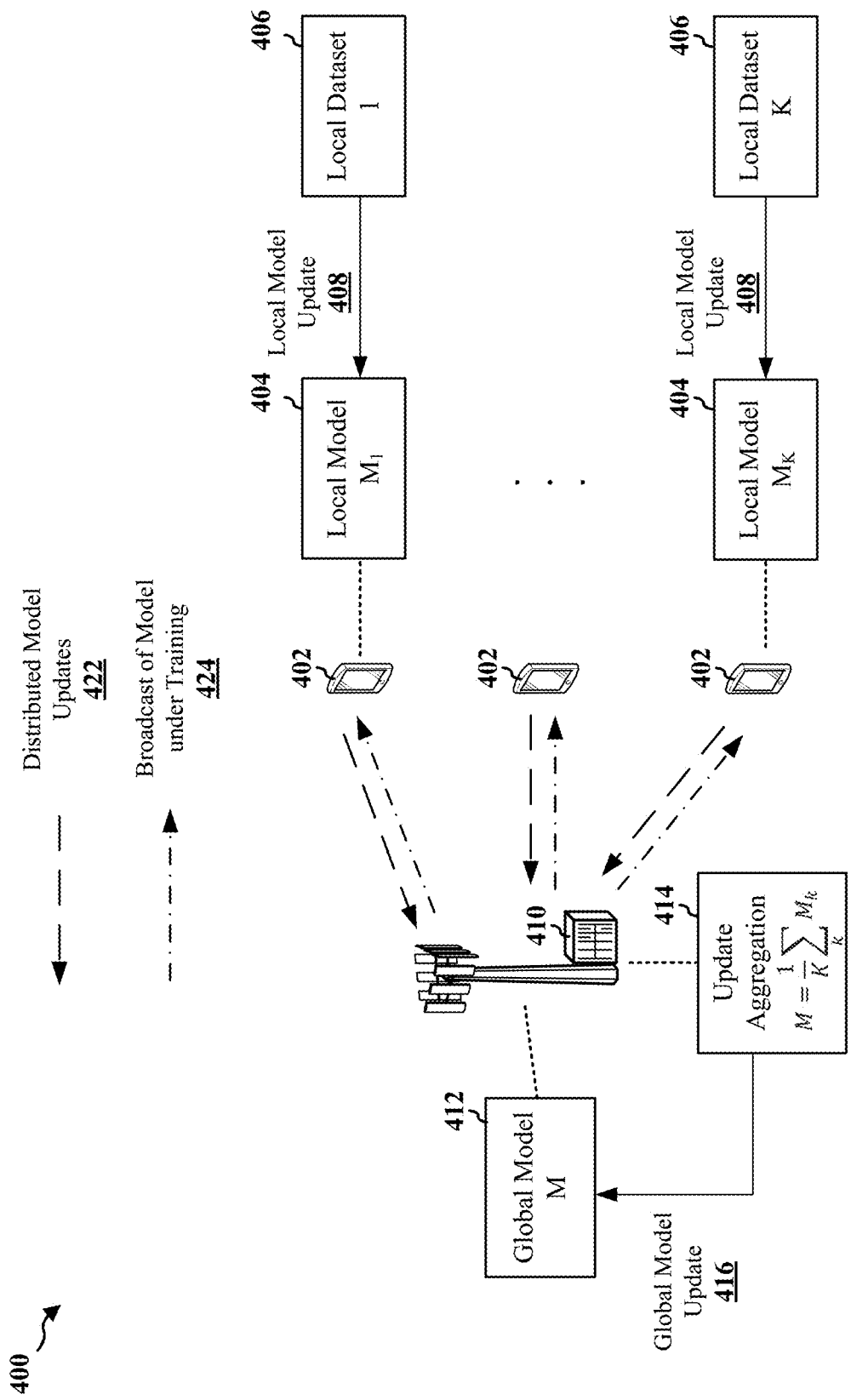
FIG. 4 is a diagram of an example environment associated with federated learning with OTA aggregation according to one or more aspects.

FIG. 4 is a diagram of an example environment 400 associated with federated learning with OTA aggregation according to one or more aspects. The parameter server 410 may correspond to the base station 102/180/310. The edge device 402 may correspond to the UE 104/350. Federated learning is a technique that may enable users (e.g., edge devices or UEs) to train a machine learning model (e.g., a neural network) in a collaborative and distributed fashion using users' local datasets at edge devices (e.g., UEs). Specifically, in each round, a parameter server 410 (e.g., an edge parameter server, such as a base station) may select a number of edge devices 402, and may transmit 424 a copy of the global machine learning model 412 (e.g., the copy may include the parameters of the global machine learning model) to each of the selected edge devices 402. Then, each edge device 402 may obtain 408 local model parameters or gradients (or gradient elements) of the machine learning model based on the local copy 404 of the machine learning model (which may be referred to as the local machine learning model hereinafter) updated with the local dataset 406 at the edge device 402. Next, each edge device 402 may feed back 422 the corresponding local model update including the updated local model parameters or the local gradient elements to the parameter server 410. Herein some aspects are described in which the local model update transmitted by the edge device 402 takes the form of gradient elements; however, it should be appreciated that with suitable adaptation of these aspects, the updated local model parameters may be used instead for feeding back the local model update. Thereafter, the parameter server 410 may aggregate 414 all the updates 422 from the edge devices 402, and may update 416 the global machine learning model 412 based on the aggregated updates 422. For the next round, the parameter server 410 may transmit a copy of the updated global machine model 412 to selected edge devices 402, and the edge devices 402 may perform again similar operations as described above. The process may be repeated for a number of times corresponding to a number of rounds until the global machine learning model 412 converges (e.g., until the global model update 416 may no longer produce any changes to the global machine learning model 412).

Federated learning may be associated with the advantage of keeping user data 406 private at edge devices 402 based on the distributed optimization framework (i.e., the user data itself may not be transmitted to the parameter server). On the other hand, communication may be a bottleneck for federated learning. In some examples, federated learning may be performed with digital transmission, where each edge device may transmit its respective local model update (e.g., gradient elements or updated local model parameters) to the parameter server separately from other edge devices over an orthogonal channel (e.g., using OFDMA or TDMA). In some other examples, federated learning may be performed with OTA aggregation, which may be associated with smaller communication overhead than digital transmission because OTA aggregation may allow the edge devices to transmit the updates over the same time-frequency resources on a multiple access channel.

In particular, for OTA aggregation, the edge devices may transmit at the same time and via the same frequency with a common analog waveform. Accordingly, the superimposed analog waveform on the multiple access channel as received by the parameter server, which may be associated with a collision of the analog waveforms from the multiple edge devices, may correspond to a sum of the local model updates (e.g., gradient elements or updated local model parameters) provided by the edge devices.

The impacts of channels may be important for OTA aggregation associated with federated learning. Ideally, channel inversion (which may be performed, for example, at the RE level) may be performed so that the analog waveform from a particular edge device corresponding to the update may be received at the parameter server (e.g., a base station) at a desired common magnitude regardless of the channel value h associated with the channel between the edge device and the parameter server. However, naïve channel inversion (e.g., brute force channel inversion in order to achieve the desired common magnitude at the receiving parameter server across the entire bandwidth) may not be possible due to the transmission power constraint at the edge device (e.g., a UE), as the channel inversion may significantly increase the transmission power at the edge device, especially for subchannels or subbands with deep fades because a very high transmitter gain may be specified for such subchannels or subbands in order to achieve the ideal channel inversion. Even if perfect channel inversion is possible, the perfect channel inversion may not be desirable or suitable from the transmission power utilization point of view.

Therefore, in one or more configurations, an edge device may selectively drop gradient elements or updated local model parameters corresponding to certain REs/subcarriers/RBs/subbands when transmitting an update to the parameter server during a round of federated learning. Hereinafter an RE/subcarrier/RB/subband may be referred to as a resource unit. In some examples, dropping gradient elements or updated local model parameters corresponding to a resource unit may include transmitting zero power on that resource unit. In some other examples, dropping gradient elements or updated local model parameters corresponding to a resource unit may also include soft dropping, i.e., transmitting the update element on the resource unit using a smaller transmitter gain than would be used for perfect channel inversion.

Figure 5:
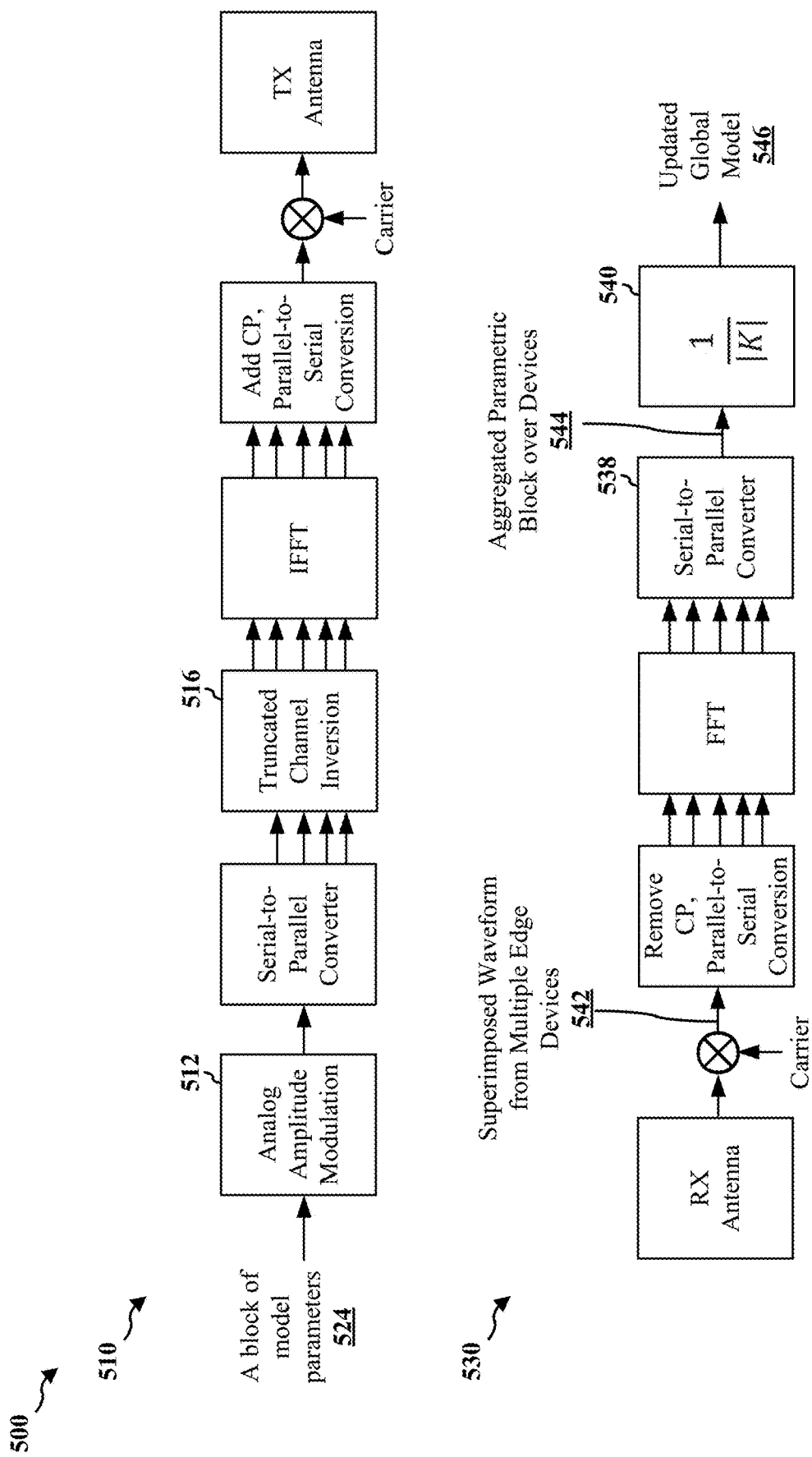
FIG. 5 is a diagram illustrating an example transmitter design for edge devices and an example receiver design for the parameter server according to one or more aspects.

FIG. 5 is a diagram 500 illustrating an example transmitter design for edge devices and an example receiver design for the parameter server according to one or more aspects. In particular, diagram 510 illustrates an example transmitter design for edge devices that may enable OTA aggregation. The design may differ from a classic OFDM transmitter in that digital modulation (e.g., quadrature amplitude modulation (QAM)) may be replaced with linear analog modulation 512 and channel-inversion power control may be added, which may correspond to a truncated channel inversion block 516. The truncated channel inversion will be explained in further detail below. The signal processing operations in the transmitter as illustrated at 510 may be described as follows. The local model update parameters/elements 524 (e.g., updated local model parameters or gradient elements) may first be amplitude-modulated into symbols at 512. The long symbol sequence may be divided into blocks. Each block may be transmitted in a single OFDM symbol with one parameter (element) over one frequency subchannel. Assuming perfect CSI at the transmitter, subchannels may be inverted by power control based on channel inversion so that updates transmitted by different edge devices may be received at the parameter server with identical amplitudes, achieving amplitude alignment at the receiver as specified for OTA aggregation. Nevertheless, a brute force channel inversion approach may be inefficient if not impossible under a power constraint since some subchannels are likely to encounter deep fades. To avoid any exceedingly high transmission power, the truncated channel inversion technique may be used at 516. To be specific, a subchannel may not be inverted if the channel gain of the subchannel is less than a channel gain threshold, and may be allocated zero power (or less power than would be used for perfect channel inversion) instead. Accordingly, the model parameters/elements (e.g., updated local model parameters or gradient elements) that are mapped to such truncated subchannels may be lost (or dropped).

Further, diagram 530 illustrates an example receiver design for the parameter server that may enable OTA aggregation. The receiver for the parameter server may have the same architecture as a conventional OFDM receiver except that the digital demodulator may be replaced with a post-processing operator that may scale the received signal 542 (which may correspond to a superimposed waveform from the multiple edge devices) to obtain the desired average model 546. The received signal 542 may be different between the receiver illustrated in diagram 530 and a conventional design as described below. In an arbitrary federated learning round, a set of edge devices may be scheduled by the parameter server to transmit their local models (e.g., updated local model parameters or gradient elements), which may be represented by the index set K. Given the simultaneous transmission from the edge devices, the parameter server may receive superimposed waveforms 542. The parameter server may obtain the aggregated local model block 544 at the serial-to-parallel converter 538 output. Next, cascading all the blocks and scaling 540 the result by a factor (e.g., the factor may be 1/|K| when the number of training samples is equal among edge devices) may give the desired updated global model 546. Then, if the global model has not converged, the parameter server may initiate the next federated learning round by broadcasting the updated global model 546 to all selected edge devices.

Transmitting the full local model update elements (e.g., gradient elements or updated local model parameters) for each edge device may lead to excessive communication overhead in terms of time-frequency resource utilization. Accordingly, in some configurations, lossy compression techniques such as sparsification or quantization may be utilized. In particular, sparsification may refer to the deliberate dropping out of some local model update elements according to certain heuristics. In one example, entries or elements of a vector that are greater than a threshold may be transmitted, while entries or elements of the vector that are less than the threshold may not be transmitted (e.g., may be dropped). Further, quantization may refer to the rounding of local model update elements to numbers that are close by. Both sparsification and quantization may lead to residual terms that may constitute the local model update error (when gradient elements are transmitted by the edge device, the local model update error may be referred to as the gradient error). In some examples, the local model update error may be the difference between the computed local model update and the update that is actually transmitted by an edge device.

Further, as described above, when truncated channel inversion is utilized, local model update elements assigned to resource units that have small channel gains (channel coefficients) (e.g., resource units whose channel gains are less than a threshold) may be dropped from the transmission from the edge devices.

Moreover, when MIMO is utilized, local model update elements may be mapped to different transmission layers based on the channel rank for MIMO channels. However, at the time of transmission, the channel rank may change (e.g., the channel rank may decrease), which may cause rank deficiency. Accordingly, the local model update elements mapped to the missing rank may not be successfully communicated when an edge device transmits the model update. In other words, some local model update elements may be unintentionally dropped at the time of transmission due to rank deficiency.

Therefore, as a result of model compression, truncated channel inversion and/or rank deficiency, the edge devices may not fully transmit the computed local model update elements to the parameter server for aggregation. Information loss may occur as a result. To avoid or mitigate the information loss, in one or more aspects, the (residual) local model update errors from one federated learning round may be added to local model update elements of one or more subsequent rounds. Accordingly, the edge device may transmit the sum to the parameter server over the one or more subsequent rounds. The technique may be referred to hereinafter as local model update accumulation. In particular, when gradient elements are transmitted by the edge device, the technique may be referred to as gradient accumulation. Similarly, when updated local model parameters are transmitted by the edge device, the technique may be referred to as local model parameter accumulation.

In one or more configurations, in each round, an edge device may identify instead of ignoring the local model update errors. As described above, the local model update errors may be a result of one or more of truncated channel inversion, rank deficiency, or model compression. The identified local model update errors from one round may be added to the local model update elements of one or more subsequent rounds. The edge device may transmit the sum to the parameter server over the one or more subsequent rounds. The local model update accumulation technique may work because the model parameters at time t and at time t+k for k>0 are expected to be highly correlated, and as a result the local model update elements computed for the time t may still contain some information for the model at the time t+k.

Hereinafter the lossy local model update approximation operation may be denoted as $\hat{g}=F(g)$, where F may represent at least one of local model update compression (e.g., compression or quantization), truncated channel inversion, or local model update dropping due to rank deficiency, etc. Hereinafter the computed local model update elements may be referred to as a first plurality of local model update elements, and the transmitted local model update elements (which may be affected by compression, truncated channel inversion, or rank deficiency, etc.) may be referred to as a second plurality of local model update elements. Accordingly, for the federated learning round 0 (i.e., the initial round), for each edge device k from 1 to K, the edge device k may compute the local model update elements based on the local dataset at the edge device k, and may obtain the local model update elements $g_k^{(0)}$ (i.e., the first plurality of local model update elements of the initial round). Next, due to the lossy local model update approximation F as described above, the edge device k may actually transmit, to the parameter server, an update $\hat{g}_k^{(0)}=F(g_k^{(0)})$ (i.e., the second plurality of local model update elements of the initial round). Thereafter, the edge device k may find the local model update error (which may be a vector) for the initial round as $e_k^{(0)}=g_k^{(0)}-\hat{g}_k^{(0)}$ (i.e., the difference between the second plurality of local model update elements and the first plurality of local model update elements).

Subsequently, for the federated learning round t that is not the initial round, for each edge device k from 1 to K, the edge device k may compute the local model update elements based on the local dataset at the edge device k, and may obtain the local model update elements $\tilde{g}_k^{(t)}$ (i.e., the first plurality of local model update elements of round t). Hereinafter the accumulated local model update elements (i.e., the sum of computed local model update elements and the local model update error from one or more previous rounds) may be referred to as a third plurality of local model update elements. The edge device k may add the local model update error from the previous round to the computed local model update elements to obtain the accumulated local model update elements for the round t as $g_k^{(t)}=\tilde{g}_k^{(t)}+e_k^{(t-1)}$ (i.e., the third plurality of local model update elements of round t). Next, the edge device k may actually transmit, to the parameter server, an update $\hat{g}_k^{(t)}=F(g_k^{(t)})$ (i.e., the second plurality of local model update elements of round t). Thereafter, the edge device k may update the local model update error for the round t as $e_k^{(t)}=g_k^{(t)}-\hat{g}_k^{(t)}$ (i.e., the difference between the second plurality of local model update elements and the third plurality of local model update elements). In one or more configurations, the operations for the round t may be repeated for a number of rounds until the federated learning process concludes when the global machine learning model converges. In one or more configurations, to unify the description of the initial round and of the subsequent rounds, the initial round may be deemed a round where the local model update error from the previous round is 0 and the first (i.e., computed) plurality of local model update elements are equal to the third (i.e., accumulated) plurality of local model update elements.

In some examples, the local model update error for one round may also be identified based on the local model update elements actually received or decoded at parameter server in that round. For example, if $\hat{g}_k^{(t)}$ was transmitted by an edge device, but was not successfully decoded (e.g., the decoding is associate with a cyclic redundancy check (CRC) error) at the parameter server, the parameter server may indicate the decoding failure to the edge device. Accordingly, the edge device may set $\hat{g}_k^{(t)}=0$, and may apply the same local model update accumulation process as described above. In other words, instead of retransmitting the update that the parameter server has failed to decode, as would be done otherwise in some configurations, the edge device may accumulate these local model update elements, which may be equal to the local model update error for this round, and may transmit the accumulated local model update error together with the subsequently computed local model update elements in one or more subsequent rounds.

Some edge devices may prefer not to implement local model update accumulation due to complexity reasons (e.g., memory usage). However, it may be unfair if some edge devices implement local model update accumulation while some other edge devices are permitted to not implement local model update accumulation as the edge devices not implementing local model update accumulation may cause performance loss while training a global model in collaboration with many edge devices that do implement local model update accumulation. Therefore, in one or more configurations, the decision of whether to implement local model update accumulation may not be left to the discretion of individual edge devices.

In one configuration, whether to implement local model update accumulation may be prespecified based on a specification. In another configuration, during federated learning initiation or configuration, the parameter server (e.g., the base station) may transmit an indication to the edge devices (e.g., UEs) to indicate whether local model update accumulation is to be used. For example, a base station may transmit, to the UEs participating in the federated learning process, an explicit "enable local model update accumulation" signal associated with the selection of a model compression scheme and/or OTA aggregation implementation. In another example, the base station may transmit a signal that may disable local model update accumulation for all UEs participating in the federated learning process.

Figure 6:
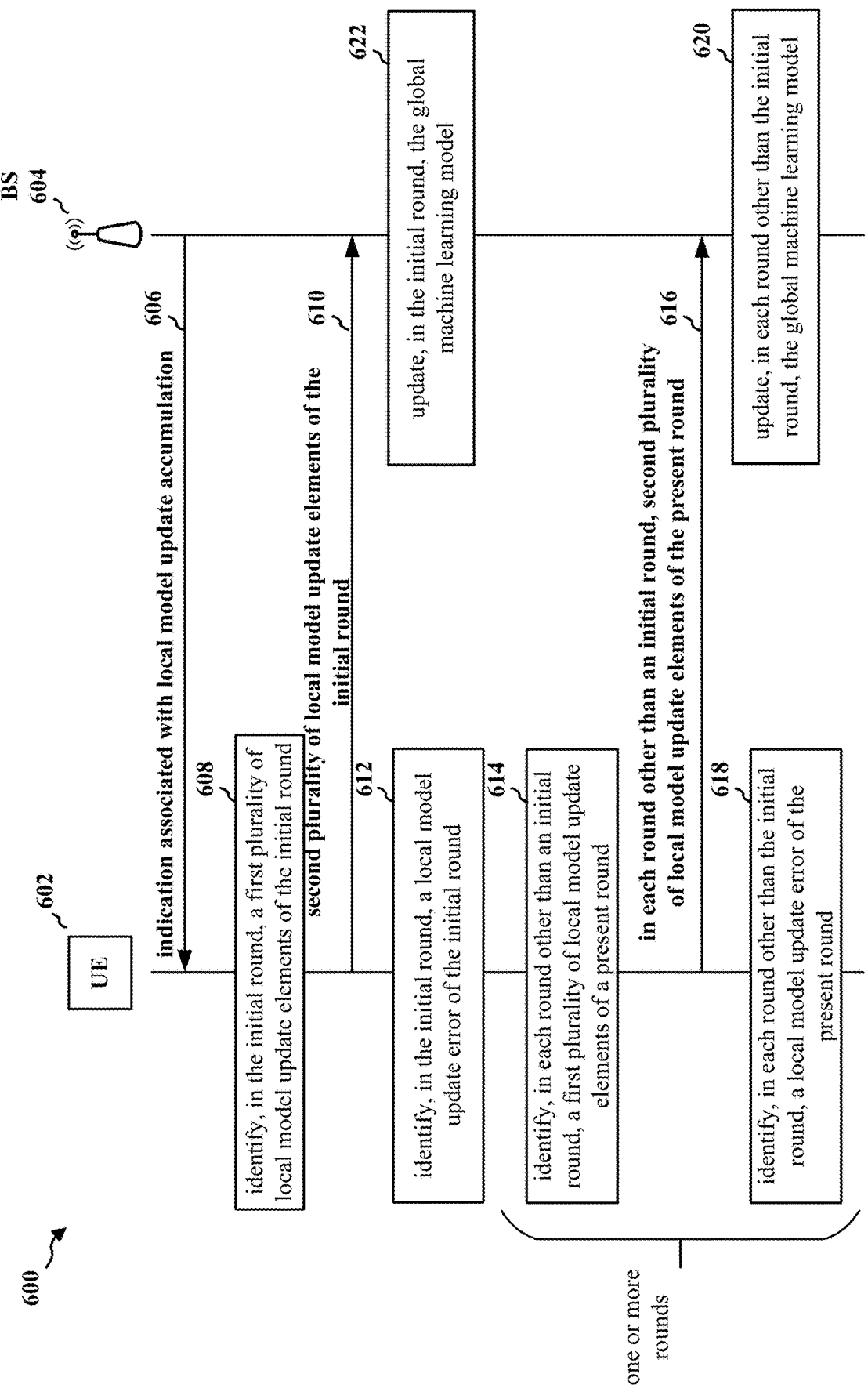
FIG. 6 is a diagram of a communication flow of a method of wireless communication.

FIG. 6 is a diagram of a communication flow 600 of a method of wireless communication. The UE 602 may correspond to an edge device (e.g., an edge device 402). The base station 604 may correspond to a parameter server (e.g., a parameter server 410). At 606, the base station 604 may transmit, to the UE 602, and the UE 602 may receive, from the base station 604, an indication associated with local model update accumulation (e.g., an indication associated with enabling or disabling local model update accumulation).

At 608, the UE 602 may identify, in the initial round, a first plurality of local model update elements (e.g., gradient elements or updated local model parameters) of the initial round. The first plurality of local model update elements of the initial round may be associated with an updated local machine learning model. The updated local machine learning model may have been generated based on a global machine learning model received from the base station 604 and a local dataset.

At 610, the UE 602 may transmit, in the initial round, to the base station 604, and the base station 604 may receive, in the initial round, from the UE 602, over the multiple access channel via analog signaling, a second plurality of local model update elements (e.g., gradient elements or updated local model parameters) of the initial round based on the first plurality of local model update elements of the initial round. The analog signaling may be associated with OTA aggregation.

At 612, the UE 602 may identify, in the initial round, a local model update error of the initial round based at least in part on one or more of the first plurality of local model update elements of the initial round, the transmitted second plurality of local model update elements of the initial round, or a decoding result at the base station 604 of the transmitted second plurality of local model update elements of the initial round.

At 622, the base station 604 may update, in the initial round, the global machine learning model based on the received second plurality of local model update elements of the initial round.

At 614, the UE 602 may identify, in each round other than an initial round, a first plurality of local model update elements (e.g., gradient elements or updated local model parameters) of a present round. The first plurality of local model update elements of the present round may be associated with an updated local machine learning model.

At 616, the UE 602 may transmit, in each round other than the initial round, to the base station 604, and the base station 604 may receive, in each round other than the initial round, from the UE 602, over a multiple access channel via analog signaling, a second plurality of local model update elements (e.g., gradient elements or updated local model parameters) of the present round based on a third plurality of local model update elements of the present round. The third plurality of local model update elements of the present round may correspond to a sum of the first plurality of local model update elements of the present round and a local model update error of a previous round immediately before the present round.

At 618, the UE 602 may identify, in each round other than the initial round, a local model update error of the present round based at least in part on one or more of the third plurality of local model update elements of the present round, the transmitted second plurality of local model update elements of the present round, or a decoding result at the base station 604 of the transmitted second plurality of local model update elements of the present round.

At 620, the base station 604 may update, in each round other than the initial round, the global machine learning model based on the received second plurality of local model update elements of the present round.

Figure 7:
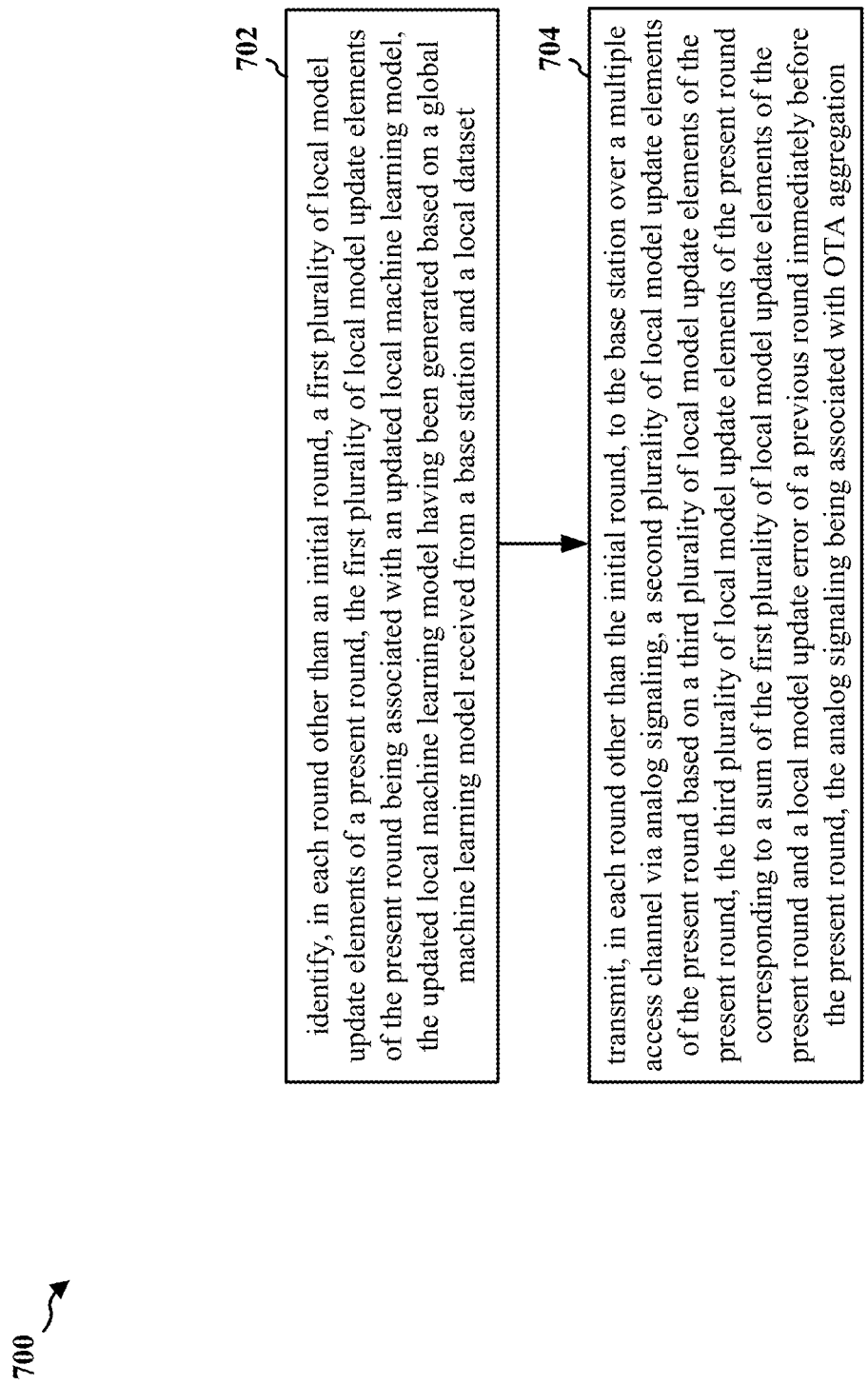
FIG. 7 is a flowchart of a method of wireless communication.

FIG. 7 is a flowchart 700 of a method of wireless communication. The method may be performed by a UE (e.g., the UE 104/350/602; the edge device 402; the apparatus 1102). At 702, the UE may identify, in each round other than an initial round, a first plurality of local model update elements of a present round. The first plurality of local model update elements of the present round may be associated with an updated local machine learning model. The updated local machine learning model may have been generated based on a global machine learning model received from a base station and a local dataset. For example, 702 may be performed by the federated learning component 1140 in FIG. 11. Referring to FIG. 6, at 614, the UE 602 may identify, in each round other than an initial round, a first plurality of local model update elements of a present round.

At 704, the UE may transmit, in each round other than the initial round, to the base station over a multiple access channel via analog signaling, a second plurality of local model update elements of the present round based on a third plurality of local model update elements of the present round. The third plurality of local model update elements of the present round may correspond to a sum of the first plurality of local model update elements of the present round and a local model update error of a previous round immediately before the present round. The analog signaling may be associated with OTA aggregation. For example, 704 may be performed by the federated learning component 1140 in FIG. 11. Referring to FIG. 6, at 616, the UE 602 may transmit, in each round other than the initial round, to the base station 604 over a multiple access channel via analog signaling, a second plurality of local model update elements of the present round based on a third plurality of local model update elements of the present round.

Figure 8:
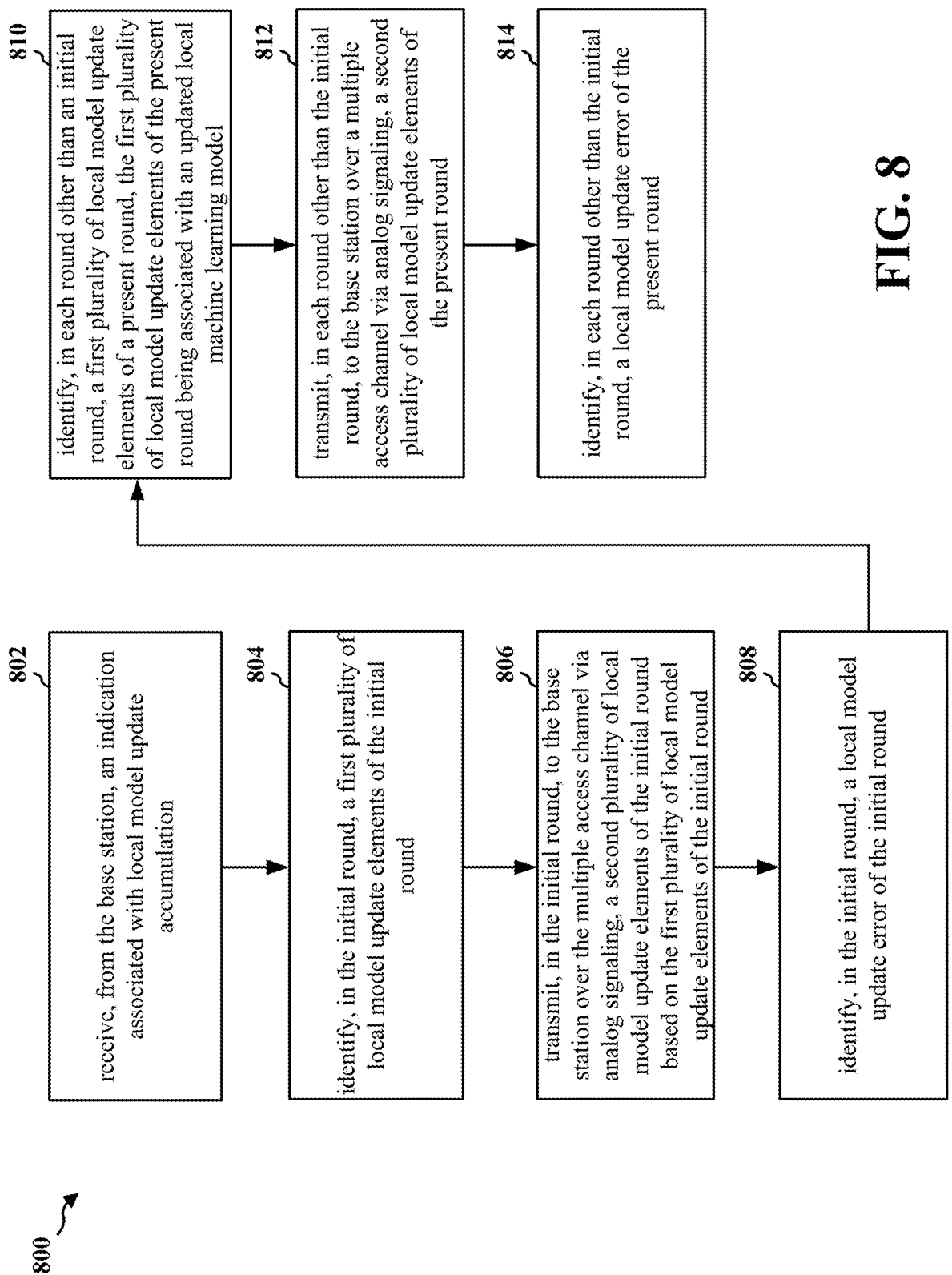
FIG. 8 is a flowchart of a method of wireless communication.

FIG. 8 is a flowchart 800 of a method of wireless communication. The method may be performed by a UE (e.g., the UE 104/350/602; the edge device 402; the apparatus 1102). At 810, the UE may identify, in each round other than an initial round, a first plurality of local model update elements of a present round. The first plurality of local model update elements of the present round may be associated with an updated local machine learning model. The updated local machine learning model may have been generated based on a global machine learning model received from a base station and a local dataset. For example, 810 may be performed by the federated learning component 1140 in FIG. 11. Referring to FIG. 6, at 614, the UE 602 may identify, in each round other than an initial round, a first plurality of local model update elements of a present round.

At 812, the UE may transmit, in each round other than the initial round, to the base station over a multiple access channel via analog signaling, a second plurality of local model update elements of the present round based on a third plurality of local model update elements of the present round. The third plurality of local model update elements of the present round may correspond to a sum of the first plurality of local model update elements of the present round and a local model update error of a previous round immediately before the present round. The analog signaling may be associated with OTA aggregation. For example, 812 may be performed by the federated learning component 1140 in FIG. 11. Referring to FIG. 6, at 616, the UE 602 may transmit, in each round other than the initial round, to the base station 604 over a multiple access channel via analog signaling, a second plurality of local model update elements of the present round based on a third plurality of local model update elements of the present round.

In one configuration, if the previous round is not the initial round, the local model update error of the previous round may correspond to a difference between a transmitted second plurality of local model update elements of the previous round and a third plurality of local model update elements of the previous round. If the previous round is the initial round, the local model update error of the previous (initial) round may correspond to a difference between a transmitted second plurality of local model update elements of the previous (initial) round and a first plurality of local model update elements of the previous (initial) round.

In one configuration, the local model update error of the previous round may be associated with, in the previous round, at least one of model compression, truncated channel inversion, or rank deficiency.

In one configuration, referring to FIG. 6, if the previous round is not the initial round, the local model update error of the previous round may correspond to a difference between a decoding result at the base station 604 of a transmitted second plurality of local model update elements of the previous round and a third plurality of local model update elements of the previous round. If the previous round is the initial round, the local model update error of the previous round may correspond to a difference between a decoding result at the base station 604 of a transmitted second plurality of local model update elements of the previous (initial) round and a first plurality of local model update elements of the previous (initial) round.

In one configuration, referring to FIG. 6, the decoding result at the base station 604 of the transmitted second plurality of local model update elements of the previous round is zero when the base station 604 failed to decode the transmitted second plurality of local model update elements of the previous round.

In one configuration, at 814, the UE may identify, in each round other than the initial round, a local model update error of the present round based at least in part on one or more of the third plurality of local model update elements of the present round, the transmitted second plurality of local model update elements of the present round, or a decoding result at the base station of the transmitted second plurality of local model update elements of the present round. For example, 814 may be performed by the federated learning component 1140 in FIG. 11. Referring to FIG. 6, at 618, the UE 602 may identify, in each round other than the initial round, a local model update error of the present round based at least in part on one or more of the third plurality of local model update elements of the present round, the transmitted second plurality of local model update elements of the present round, or a decoding result at the base station 604 of the transmitted second plurality of local model update elements of the present round.

In one configuration, the local model update error of the present round may correspond to a difference between the transmitted second plurality of local model update elements of the present round and the third plurality of local model update elements of the present round.

In one configuration, referring to FIG. 6, the local model update error of the present round may correspond to a difference between a decoding result at the base station 604 of the transmitted second plurality of local model update elements of the present round and the third plurality of local model update elements of the present round.

In one configuration, at 804, the UE may identify, in the initial round, a first plurality of local model update elements of the initial round. For example, 804 may be performed by the federated learning component 1140 in FIG. 11. Referring to FIG. 6, at 608, the UE 602 may identify, in the initial round, a first plurality of local model update elements of the initial round.

At 806, the UE may transmit, in the initial round, to the base station over the multiple access channel via analog signaling, a second plurality of local model update elements of the initial round based on the first plurality of local model update elements of the initial round. For example, 806 may be performed by the federated learning component 1140 in FIG. 11. Referring to FIG. 6, at 610, the UE 602 may transmit, in the initial round, to the base station 604 over the multiple access channel via analog signaling, a second plurality of local model update elements of the initial round based on the first plurality of local model update elements of the initial round.

At 808, the UE may identify, in the initial round, a local model update error of the initial round based at least in part on one or more of the first plurality of local model update elements of the initial round, the transmitted second plurality of local model update elements of the initial round, or a decoding result at the base station of the transmitted second plurality of local model update elements of the initial round. For example, 808 may be performed by the federated learning component 1140 in FIG. 11. Referring to FIG. 6, at 612, the UE 602 may identify, in the initial round, a local model update error of the initial round based at least in part on one or more of the first plurality of local model update elements of the initial round, the transmitted second plurality of local model update elements of the initial round, or a decoding result at the base station 604 of the transmitted second plurality of local model update elements of the initial round.

In one configuration, at 802, the UE may receive, from the base station, an indication associated with local model update accumulation. For example, 802 may be performed by the federated learning component 1140 in FIG. 11. Referring to FIG. 6, at 606, the UE 602 may receive, from the base station 604, an indication associated with local model update accumulation.

In one configuration, the indication associated with local model update accumulation may be further associated with at least one of model compression, the OTA aggregation, truncated channel inversion, or rank deficiency.

In one configuration, the first plurality of local model update elements of the present round may include a first plurality of gradient elements of the present round or a first plurality of updated local model parameters of the present round. The second plurality of local model update elements of the present round may include a second plurality of gradient elements of the present round or a second plurality of updated local model parameters of the present round.

Figure 9:
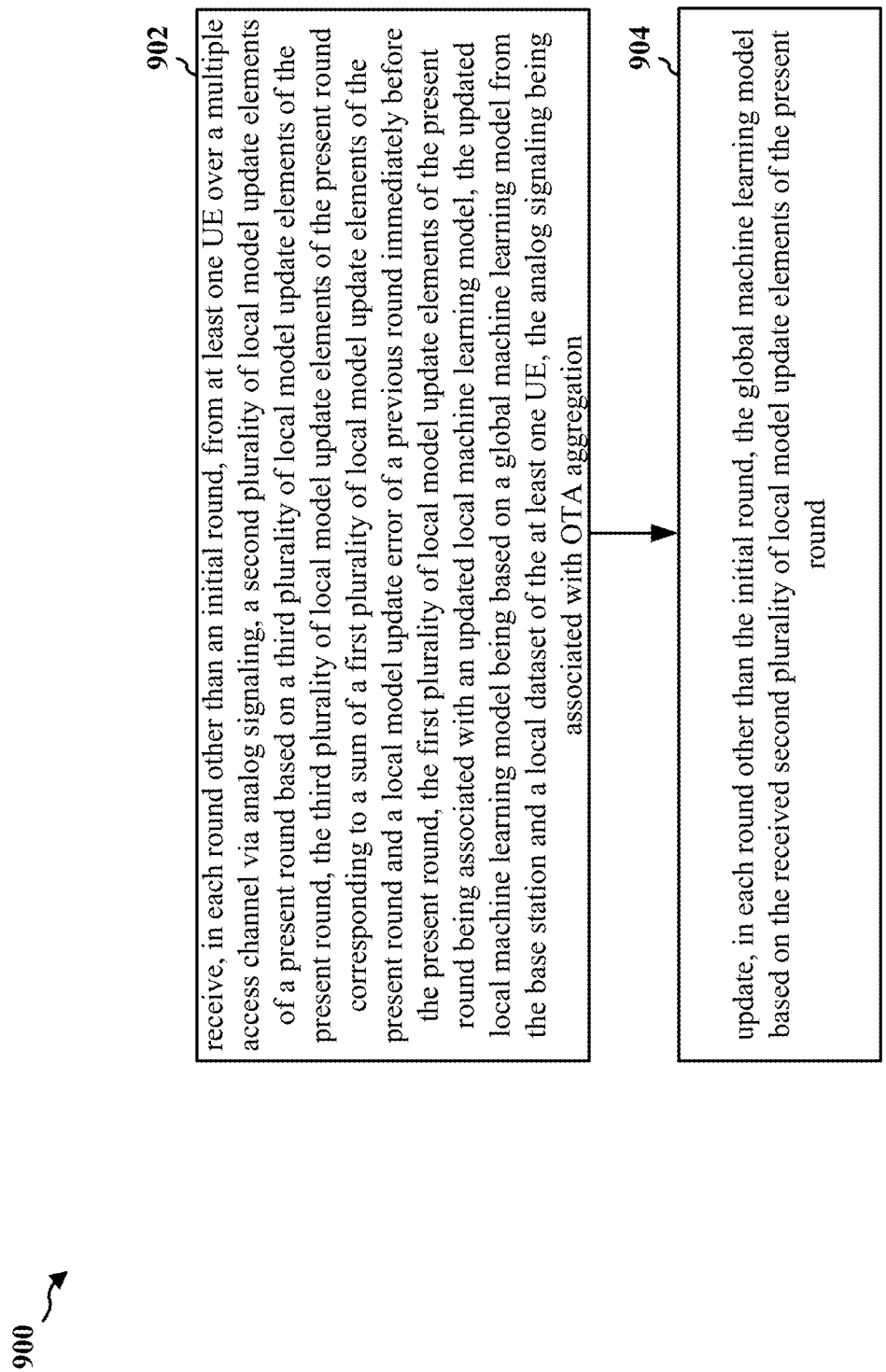
FIG. 9 is a flowchart of a method of wireless communication.

FIG. 9 is a flowchart 900 of a method of wireless communication. The method may be performed by a base station (e.g., the base station 102/180/310/604; the parameter server 410; the apparatus 1202). At 902, the base station may receive, in each round other than an initial round, from at least one UE over a multiple access channel via analog signaling, a second plurality of local model update elements of a present round based on a third plurality of local model update elements of the present round. The third plurality of local model update elements of the present round may correspond to a sum of a first plurality of local model update elements of the present round and a local model update error of a previous round immediately before the present round. The first plurality of local model update elements of the present round may be associated with an updated local machine learning model. The updated local machine learning model may be based on a global machine learning model from the base station and a local dataset of the at least one UE. The analog signaling may be associated with OTA aggregation. For example, 902 may be performed by the federated learning component 1240 in FIG. 12. Referring to FIG. 6, at 616, the base station 604 may receive, in each round other than an initial round, from at least one UE 602 over a multiple access channel via analog signaling, a second plurality of local model update elements of a present round based on a sum of a first plurality of local model update elements of the present round and a local model update error of a previous round immediately before the present round.

At 904, the base station may update, in each round other than the initial round, the global machine learning model based on the received second plurality of local model update elements of the present round. For example, 904 may be performed by the federated learning component 1240 in FIG. 12. Referring to FIG. 6, at 620, the base station 604 may update, in each round other than the initial round, the global machine learning model based on the received second plurality of local model update elements of the present round.

Figure 10:
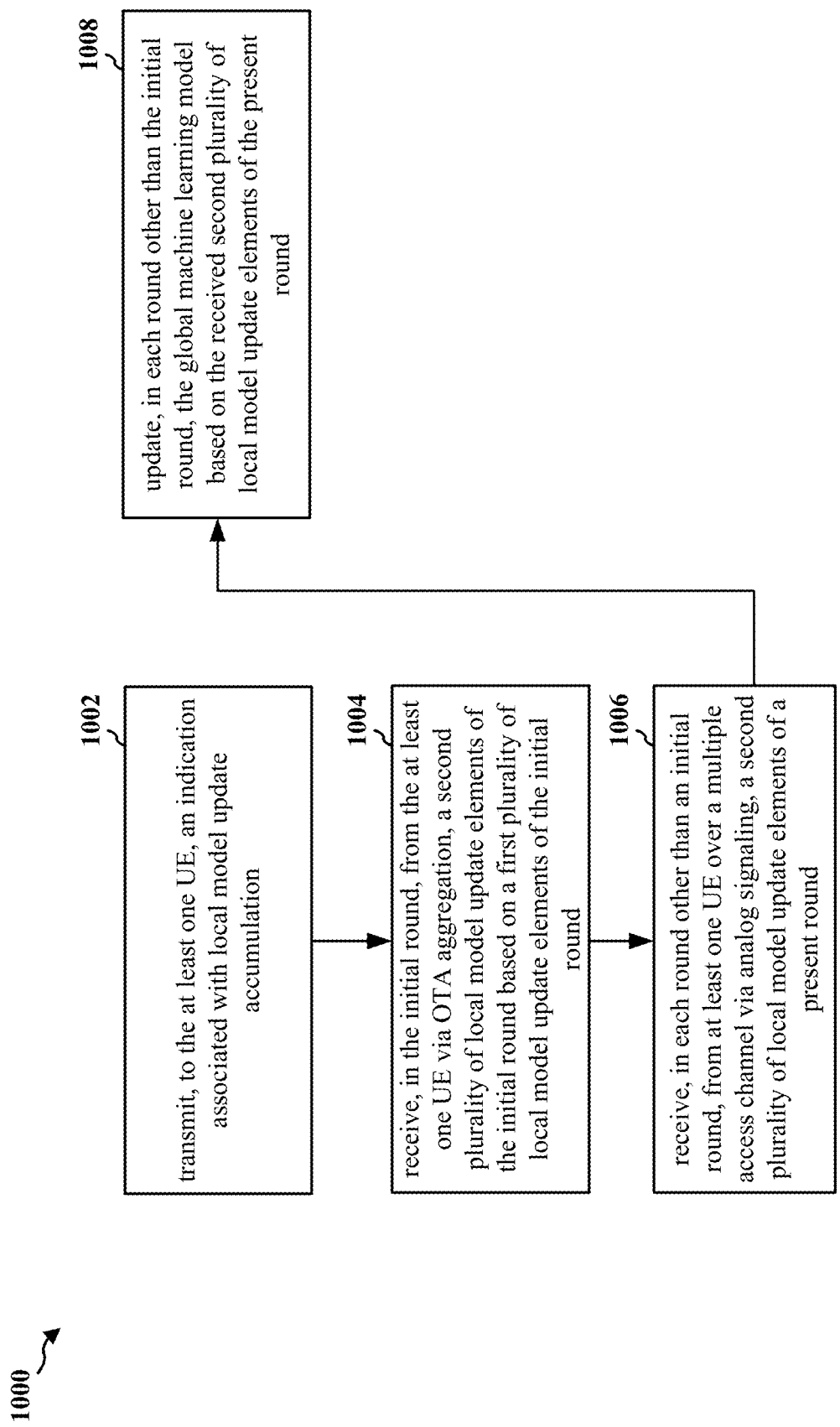
FIG. 10 is a flowchart of a method of wireless communication.

FIG. 10 is a flowchart 1000 of a method of wireless communication. The method may be performed by a base station (e.g., the base station 102/180/310/604; the parameter server 410; the apparatus 1202). At 1006, the base station may receive, in each round other than an initial round, from at least one UE over a multiple access channel via analog signaling, a second plurality of local model update elements of a present round based on a third plurality of local model update elements of the present round. The third plurality of local model update elements of the present round may correspond to a sum of a first plurality of local model update elements of the present round and a local model update error of a previous round immediately before the present round. The first plurality of local model update elements of the present round may be associated with an updated local machine learning model. The updated local machine learning model may be based on a global machine learning model from the base station and a local dataset of the at least one UE. The analog signaling may be associated with OTA aggregation. For example, 1006 may be performed by the federated learning component 1240 in FIG. 12. Referring to FIG. 6, at 616, the base station 604 may receive, in each round other than an initial round, from at least one UE 602 over a multiple access channel via analog signaling, a second plurality of local model update elements of a present round based on a sum of a first plurality of local model update elements of the present round and a local model update error of a previous round immediately before the present round.

At 1008, the base station may update, in each round other than the initial round, the global machine learning model based on the received second plurality of local model update elements of the present round. For example, 1008 may be performed by the federated learning component 1240 in FIG. 12. Referring to FIG. 6, at 620, the base station 604 may update, in each round other than the initial round, the global machine learning model based on the received second plurality of local model update elements of the present round.

In one configuration, if the previous round is not the initial round, the local model update error of the previous round may correspond to a difference between a second plurality of local model update elements of the previous round and a third plurality of local model update elements of the previous round. If the previous round is the initial round, the local model update error of the previous (initial) round may correspond to a difference between a second plurality of local model update elements of the previous (initial) round and a first plurality of local model update elements of the previous (initial) round.

In one configuration, the local model update error of the previous round may be associated with, in the previous round, at least one of model compression, truncated channel inversion, or rank deficiency.

In one configuration, referring to FIG. 6, if the previous round is not the initial round, the local model update error of the previous round may correspond to a difference between a decoding result at the base station 604 of a second plurality of local model update elements of the previous round and a third plurality of local model update elements of the previous round. If the previous round is the initial round, the local model update error of the previous (initial) round may correspond to a difference between a decoding result at the base station 604 of a second plurality of local model update elements of the previous (initial) round and a first plurality of local model update elements of the previous (initial) round.

In one configuration, referring to FIG. 6, the decoding result at the base station 604 of the second plurality of local model update elements of the previous round is zero when the base station 604 failed to decode the second plurality of local model update elements of the previous round.

In one configuration, a local model update error of the present round may correspond to a difference between the second plurality of local model update elements of the present round and the third plurality of local model update elements of the present round.

In one configuration, referring to FIG. 6, the local model update error of the present round may correspond to a difference between a decoding result at the base station 604 of the second plurality of local model update elements of the present round and the third plurality of local model update elements of the present round.

In one configuration, at 1004, the base station may receive, in the initial round, from the at least one UE over the multiple access channel via analog signaling, a second plurality of local model update elements of the initial round based on a first plurality of local model update elements of the initial round. For example, 1004 may be performed by the federated learning component 1240 in FIG. 12. Referring to FIG. 6, at 610, the base station 604 may receive, in the initial round, from the at least one UE 602 over the multiple access channel via analog signaling, a second plurality of local model update elements of the initial round based on a first plurality of local model update elements of the initial round.

In one configuration, at 1002, the base station may transmit, to the at least one UE, an indication associated with local model update accumulation. For example, 1002 may be performed by the federated learning component 1240 in FIG. 12. Referring to FIG. 6, at 606, the base station 604 may transmit, to the at least one UE 602, an indication associated with local model update accumulation.

In one configuration, the indication associated with local model update accumulation may be further associated with at least one of model compression, the OTA aggregation, truncated channel inversion, or rank deficiency.

In one configuration, the first plurality of local model update elements of the present round may include a first plurality of gradient elements of the present round or a first plurality of updated local model parameters of the present round. The second plurality of local model update elements of the present round may include a second plurality of gradient elements of the present round or a second plurality of updated local model parameters of the present round.

Figure 11:
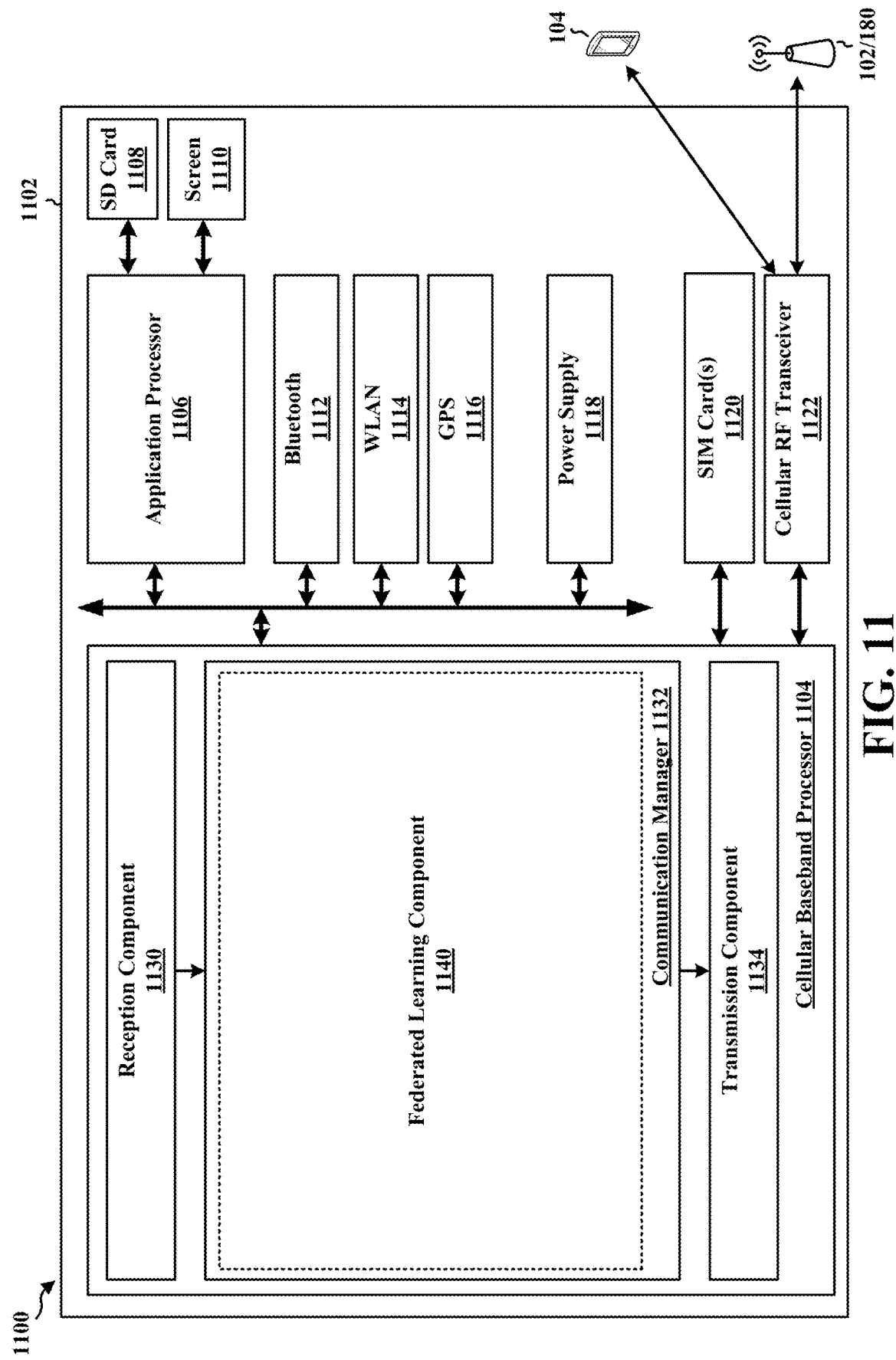
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a federated learning component 1140 that may be configured to receive, from the base station, an indication associated with local model update accumulation, e.g., as described in connection with 802 in FIG. 8. The federated learning component 1140 may be configured to identify, in the initial round, a first plurality of local model update elements of the initial round, e.g., as described in connection with 804 in FIG. 8. The federated learning component 1140 may be configured to transmit, in the initial round, to the base station over the multiple access channel via analog signaling, a second plurality of local model update elements of the initial round based on the first plurality of local model update elements of the initial round, e.g., as described in connection with 806 in FIG. 8. The federated learning component 1140 may be configured to identify, in the initial round, a local model update error of the initial round based at least in part on one or more of the first plurality of local model update elements of the initial round, the transmitted second plurality of local model update elements of the initial round, or a decoding result at the base station of the transmitted second plurality of local model update elements of the initial round, e.g., as described in connection with 808 in FIG. 8. The federated learning component 1140 may be configured to identify, in each round other than an initial round, a first plurality of local model update elements of a present round, e.g., as described in connection with 702 in FIG. 7 and 810 in FIG. 8. The federated learning component 1140 may be configured to transmit, in each round other than the initial round, to the base station over a multiple access channel via analog signaling, a second plurality of local model update elements of the present round based on a third plurality of local model update elements of the present round, e.g., as described in connection with 704 in FIG. 7 and 812 in FIG. 8. The federated learning component 1140 may be configured to identify, in each round other than the initial round, a local model update error of the present round based at least in part on one or more of the third plurality of local model update elements of the present round, the transmitted second plurality of local model update elements of the present round, or a decoding result at the base station of the transmitted second plurality of local model update elements of the present round, e.g., as described in connection with 814 in FIG. 8.

The apparatus may include additional components that perform each of the blocks of the algorithm in the flowcharts of FIGS. 6-8. As such, each block in the flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for identifying, in each round other than an initial round, a first plurality of local model update elements of a present round. The first plurality of local model update elements of the present round may be associated with an updated local machine learning model. The updated local machine learning model may have been generated based on a global machine learning model received from a base station and a local dataset. The apparatus 1102, and in particular the cellular baseband processor 1104, includes means for transmitting, in each round other than the initial round, to the base station over a multiple access channel via analog signaling, a second plurality of local model update elements of the present round based on a third plurality of local model update elements of the present round. The third plurality of local model update elements of the present round may correspond to a sum of the first plurality of local model update elements of the present round and a local model update error of a previous round immediately before the present round. The analog signaling may be associated with OTA aggregation.

In one configuration, the local model update error of the previous round may correspond to a difference between a transmitted second plurality of local model update elements of the previous round and a third plurality of local model update elements of the previous round. In one configuration, the local model update error of the previous round may be associated with, in the previous round, at least one of model compression, truncated channel inversion, or rank deficiency. In one configuration, the local model update error of the previous round may correspond to a difference between a decoding result at the base station of a transmitted second plurality of local model update elements of the previous round and a third plurality of local model update elements of the previous round. In one configuration, the decoding result at the base station of the transmitted second plurality of local model update elements of the previous round is zero when the base station failed to decode the transmitted second plurality of local model update elements of the previous round. In one configuration, the apparatus 1102, and in particular the cellular baseband processor 1104, includes means for identifying, in each round other than the initial round, a local model update error of the present round based at least in part on one or more of the third plurality of local model update elements of the present round, the transmitted second plurality of local model update elements of the present round, or a decoding result at the base station of the transmitted second plurality of local model update elements of the present round. In one configuration, the local model update error of the present round may correspond to a difference between the transmitted second plurality of local model update elements of the present round and the third plurality of local model update elements of the present round. In one configuration, the local model update error of the present round may correspond to a difference between a decoding result at the base station of the transmitted second plurality of local model update elements of the present round and the third plurality of local model update elements of the present round. In one configuration, the apparatus 1102, and in particular the cellular baseband processor 1104, includes means for identifying, in the initial round, a first plurality of local model update elements of the initial round. The apparatus 1102, and in particular the cellular baseband processor 1104, includes means for transmitting, in the initial round, to the base station over the multiple access channel via analog signaling, a second plurality of local model update elements of the initial round based on the first plurality of local model update elements of the initial round. The apparatus 1102, and in particular the cellular baseband processor 1104, includes means for identifying, in the initial round, a local model update error of the initial round based at least in part on one or more of the first plurality of local model update elements of the initial round, the transmitted second plurality of local model update elements of the initial round, or a decoding result at the base station of the transmitted second plurality of local model update elements of the initial round. In one configuration, the apparatus 1102, and in particular the cellular baseband processor 1104, includes means for receiving, from the base station, an indication associated with local model update accumulation. In one configuration, the indication associated with local model update accumulation may be further associated with at least one of model compression, the OTA aggregation, truncated channel inversion, or rank deficiency. In one configuration, the first plurality of local model update elements of the present round may include a first plurality of gradient elements of the present round or a first plurality of updated local model parameters of the present round. The second plurality of local model update elements of the present round may include a second plurality of gradient elements of the present round or a second plurality of updated local model parameters of the present round.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
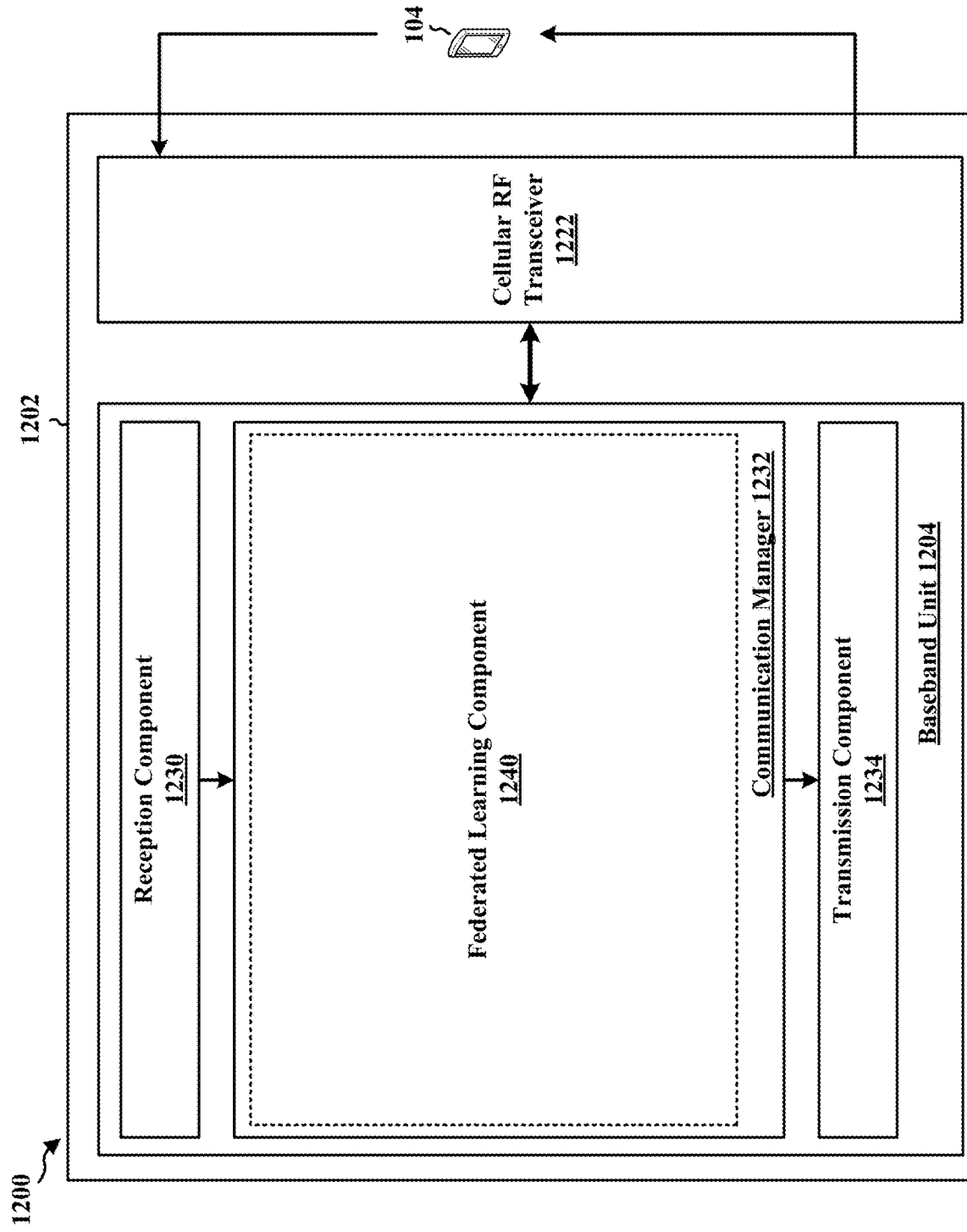
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a federated learning component 1240 that may be configured to transmit, to the at least one UE, an indication associated with local model update accumulation, e.g., as described in connection with 1002 in FIG. 10. The federated learning component 1240 may be configured to receive, in the initial round, from the at least one UE over the multiple access channel via analog signaling, a second plurality of local model update elements of the initial round based on a first plurality of local model update elements of the initial round, e.g., as described in connection with 1004 in FIG. 10. The federated learning component 1240 may be configured to receive, in each round other than an initial round, from at least one UE over a multiple access channel via analog signaling, a second plurality of local model update elements of a present round based on a third plurality of local model update elements of the present round, e.g., as described in connection with 902 in FIG. 9 and 1006 in FIG. 10. The federated learning component 1240 may be configured to update, in each round other than the initial round, the global machine learning model based on the received second plurality of local model update elements of the present round, e.g., as described in connection with 904 in FIG. 9 and 1008 in FIG. 10.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for receiving, in each round other than an initial round, from at least one UE over a multiple access channel via analog signaling, a second plurality of local model update elements of a present round based on a third plurality of local model update elements of the present round. The third plurality of local model update elements of the present round may correspond to a sum of a first plurality of local model update elements of the present round and a local model update error of a previous round immediately before the present round. The first plurality of local model update elements of the present round may be associated with an updated local machine learning model. The updated local machine learning model may be based on a global machine learning model from the base station and a local dataset of the at least one UE. The analog signaling may be associated with OTA aggregation. The apparatus 1202, and in particular the baseband unit 1204, includes means for updating, in each round other than the initial round, the global machine learning model based on the received second plurality of local model update elements of the present round.

In one configuration, the local model update error of the previous round may correspond to a difference between a second plurality of local model update elements of the previous round and a third plurality of local model update elements of the previous round. In one configuration, the local model update error of the previous round may be associated with, in the previous round, at least one of model compression, truncated channel inversion, or rank deficiency. In one configuration, the local model update error of the previous round may correspond to a difference between a decoding result at the base station of a second plurality of local model update elements of the previous round and a third plurality of local model update elements of the previous round. In one configuration, the decoding result at the base station of the second plurality of local model update elements of the previous round is zero when the base station failed to decode the second plurality of local model update elements of the previous round. In one configuration, a local model update error of the present round may correspond to a difference between the second plurality of local model update elements of the present round and the third plurality of local model update elements of the present round. In one configuration, the local model update error of the present round may correspond to a difference between a decoding result at the base station of the second plurality of local model update elements of the present round and the third plurality of local model update elements of the present round. In one configuration, the apparatus 1202, and in particular the baseband unit 1204, includes means for receiving, in the initial round, from the at least one UE over the multiple access channel via analog signaling, a second plurality of local model update elements of the initial round based on a first plurality of local model update elements of the initial round. In one configuration, the apparatus 1202, and in particular the baseband unit 1204, includes means for transmitting, to the at least one UE, an indication associated with local model update accumulation. In one configuration, the indication associated with local model update accumulation may be further associated with at least one of model compression, the OTA aggregation, truncated channel inversion, or rank deficiency. In one configuration, the first plurality of local model update elements of the present round may include a first plurality of gradient elements of the present round or a first plurality of updated local model parameters of the present round. The second plurality of local model update elements of the present round may include a second plurality of gradient elements of the present round or a second plurality of updated local model parameters of the present round.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 4-12, a UE may identify, in each round other than an initial round, a first plurality of local model update elements of a present round. The first plurality of local model update elements of the present round may be associated with an updated local machine learning model. The updated local machine learning model may have been generated based on a global machine learning model received from a base station and a local dataset. The UE may transmit to a base station, and the base station may receive from the UE, in each round other than the initial round, over a multiple access channel via analog signaling, a second plurality of local model update elements of the present round based on a third plurality of local model update elements of the present round. The third plurality of local model update elements of the present round may correspond to a sum of the first plurality of local model update elements of the present round and a local model update error of a previous round immediately before the present round. The analog signaling may be associated with OTA aggregation. The base station may update, in each round other than the initial round, the global machine learning model based on the received second plurality of local model update elements of the present round. Accordingly, the information loss that may occur as a result of local model update compression, truncated channel inversion, and/or rank deficiency in a federated learning process may be avoided or mitigated.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to identify, in each round other than an initial round, a first plurality of local model update elements of a present round, the first plurality of local model update elements of the present round being associated with an updated local machine learning model, the updated local machine learning model having been generated based on a global machine learning model received from a base station and a local dataset; and transmit, in each round other than the initial round, to the base station over a multiple access channel via analog signaling, a second plurality of local model update elements of the present round based on a third plurality of local model update elements of the present round. The third plurality of local model update elements of the present round may correspond to a sum of the first plurality of local model update elements of the present round and a local model update error of a previous round immediately before the present round, the analog signaling being associated with OTA aggregation.

Aspect 2 is the apparatus of aspect 1, where the local model update error of the previous round corresponds to a difference between a transmitted second plurality of local model update elements of the previous round and a third plurality of local model update elements of the previous round.

Aspect 3 is the apparatus of aspect 2, where the local model update error of the previous round is associated with, in the previous round, at least one of model compression, truncated channel inversion, or rank deficiency.

Aspect 4 is the apparatus of aspect 1, where the local model update error of the previous round corresponds to a difference between a decoding result at the base station of a transmitted second plurality of local model update elements of the previous round and a third plurality of local model update elements of the previous round.

Aspect 5 is the apparatus of aspect 4, where the decoding result at the base station of the transmitted second plurality of local model update elements of the previous round is zero when the base station failed to decode the transmitted second plurality of local model update elements of the previous round.

Aspect 6 is the apparatus of any of aspects 1 to 5, the at least one processor being further configured to: identify, in each round other than the initial round, a local model update error of the present round based at least in part on one or more of the third plurality of local model update elements of the present round, the transmitted second plurality of local model update elements of the present round, or a decoding result at the base station of the transmitted second plurality of local model update elements of the present round.

Aspect 7 is the apparatus of aspect 6, where the local model update error of the present round corresponds to a difference between the transmitted second plurality of local model update elements of the present round and the third plurality of local model update elements of the present round.

Aspect 8 is the apparatus of aspect 6, where the local model update error of the present round corresponds to a difference between a decoding result at the base station of the transmitted second plurality of local model update elements of the present round and the third plurality of local model update elements of the present round.

Aspect 9 is the apparatus of any of aspects 1 to 8, the at least one processor being further configured to: identify, in the initial round, a first plurality of local model update elements of the initial round; transmit, in the initial round, to the base station over the multiple access channel via analog signaling, a second plurality of local model update elements of the initial round based on the first plurality of local model update elements of the initial round; and identify, in the initial round, a local model update error of the initial round based at least in part on one or more of the first plurality of local model update elements of the initial round, the transmitted second plurality of local model update elements of the initial round, or a decoding result at the base station of the transmitted second plurality of local model update elements of the initial round.

Aspect 10 is the apparatus of any of aspects 1 to 9, the at least one processor being further configured to: receive, from the base station, an indication associated with local model update accumulation.

Aspect 11 is the apparatus of aspect 10, where the indication associated with local model update accumulation is further associated with at least one of model compression, the OTA aggregation, truncated channel inversion, or rank deficiency.

Aspect 12 is the apparatus of any of aspects 1 to 11, where the first plurality of local model update elements of the present round include a first plurality of gradient elements of the present round or a first plurality of updated local model parameters of the present round, and the second plurality of local model update elements of the present round include a second plurality of gradient elements of the present round or a second plurality of updated local model parameters of the present round.

Aspect 13 is the apparatus of any of aspects 1 to 12, further including a transceiver coupled to the at least one processor.

Aspect 14 is an apparatus for wireless communication at a base station including at least one processor coupled to a memory and configured to receive, in each round other than an initial round, from at least one UE over a multiple access channel via analog signaling, a second plurality of local model update elements of a present round based on a third plurality of local model update elements of the present round. The third plurality of local model update elements of the present round may corresponds to a sum of a first plurality of local model update elements of the present round and a local model update error of a previous round immediately before the present round, the first plurality of local model update elements of the present round being associated with an updated local machine learning model, the updated local machine learning model being based on a global machine learning model from the base station and a local dataset of the at least one UE, the analog signaling being associated with OTA aggregation; and update, in each round other than the initial round, the global machine learning model based on the received second plurality of local model update elements of the present round.

Aspect 15 is the apparatus of aspect 14, where the local model update error of the previous round corresponds to a difference between a second plurality of local model update elements of the previous round and a third plurality of local model update elements of the previous round.

Aspect 16 is the apparatus of aspect 15, where the local model update error of the previous round is associated with, in the previous round, at least one of model compression, truncated channel inversion, or rank deficiency.

Aspect 17 is the apparatus of aspect 14, where the local model update error of the previous round corresponds to a difference between a decoding result at the base station of a second plurality of local model update elements of the previous round and a third plurality of local model update elements of the previous round.

Aspect 18 is the apparatus of aspect 17, where the decoding result at the base station of the second plurality of local model update elements of the previous round is zero when the base station failed to decode the second plurality of local model update elements of the previous round.

Aspect 19 is the apparatus of any of aspects 14 to 18, where a local model update error of the present round corresponds to a difference between the second plurality of local model update elements of the present round and the third plurality of local model update elements of the present round.

Aspect 20 is the apparatus of any of aspects 14 to 18, where the local model update error of the present round corresponds to a difference between a decoding result at the base station of the second plurality of local model update elements of the present round and the third plurality of local model update elements of the present round.

Aspect 21 is the apparatus of any of aspects 14 to 20, the at least one processor being further configured to: receive, in the initial round, from the at least one UE over the multiple access channel via analog signaling, a second plurality of local model update elements of the initial round based on a first plurality of local model update elements of the initial round.

Aspect 22 is the apparatus of any of aspects 14 to 21, the at least one processor being further configured to: transmit, to the at least one UE, an indication associated with local model update accumulation.

Aspect 23 is the apparatus of aspect 22, where the indication associated with local model update accumulation is further associated with at least one of model compression, the OTA aggregation, truncated channel inversion, or rank deficiency.

Aspect 24 is the apparatus of any of aspects 14 to 23, where the first plurality of local model update elements of the present round include a first plurality of gradient elements of the present round or a first plurality of updated local model parameters of the present round, and the second plurality of local model update elements of the present round include a second plurality of gradient elements of the present round or a second plurality of updated local model parameters of the present round.

Aspect 25 is the apparatus of any of aspects 14 to 24, further including a transceiver coupled to the at least one processor.

Aspect 26 is a method of wireless communication for implementing any of aspects 1 to 25.

Aspect 27 is an apparatus for wireless communication including means for implementing any of aspects 1 to 25.

Aspect 28 is a computer-readable medium storing computer executable code, where the code when executed by a processor causes the processor to implement any of aspects 1 to 25.

What is claimed is:

1. An apparatus for wireless communication at a user equipment (UE), comprising:
    a memory; and
    at least one processor coupled to the memory and configured to:
        identify, in each round other than an initial round, a first plurality of local model update elements of a present round, the first plurality of local model update elements of the present round being associated with an updated local machine learning model, the updated local machine learning model having been generated based on a global machine learning model received from a base station and a local dataset; and
        transmit, in each round other than the initial round, to the base station over a multiple access channel via analog signaling, a second plurality of local model update elements of the present round based on a third plurality of local model update elements of the present round, the third plurality of local model update elements of the present round corresponding to a sum of the first plurality of local model update elements of the present round and a local model update error of a previous round immediately before the present round, the analog signaling being associated with over-the-air (OTA) aggregation.

2. The apparatus of claim 1, wherein the local model update error of the previous round corresponds to a difference between a transmitted second plurality of local model update elements of the previous round and a third plurality of local model update elements of the previous round.

3. The apparatus of claim 2, wherein the local model update error of the previous round is associated with, in the previous round, at least one of model compression, truncated channel inversion, or rank deficiency.

4. The apparatus of claim 1, wherein the local model update error of the previous round corresponds to a difference between a decoding result at the base station of a transmitted second plurality of local model update elements of the previous round and a third plurality of local model update elements of the previous round.

5. The apparatus of claim 4, wherein the decoding result at the base station of the transmitted second plurality of local model update elements of the previous round is zero when the base station failed to decode the transmitted second plurality of local model update elements of the previous round.

6. The apparatus of claim 1, the at least one processor being further configured to:
    identify, in each round other than the initial round, a local model update error of the present round based at least in part on one or more of the third plurality of local model update elements of the present round, the transmitted second plurality of local model update elements of the present round, or a decoding result at the base station of the transmitted second plurality of local model update elements of the present round.

7. The apparatus of claim 6, wherein the local model update error of the present round corresponds to a difference between the transmitted second plurality of local model update elements of the present round and the third plurality of local model update elements of the present round.

8. The apparatus of claim 6, wherein the local model update error of the present round corresponds to a difference between a decoding result at the base station of the transmitted second plurality of local model update elements of the present round and the third plurality of local model update elements of the present round.

9. The apparatus of claim 1, the at least one processor being further configured to:
    identify, in the initial round, a first plurality of local model update elements of the initial round;

transmit, in the initial round, to the base station over the multiple access channel via analog signaling, a second plurality of local model update elements of the initial round based on the first plurality of local model update elements of the initial round; and identify, in the initial round, a local model update error of the initial round based at least in part on one or more of the first plurality of local model update elements of the initial round, the transmitted second plurality of local model update elements of the initial round, or a decoding result at the base station of the transmitted second plurality of local model update elements of the initial round.

10. The apparatus of claim 1, the at least one processor being further configured to:
receive, from the base station, an indication associated with local model update accumulation.

11. The apparatus of claim 10, wherein the indication associated with local model update accumulation is further associated with at least one of model compression, the OTA aggregation, truncated channel inversion, or rank deficiency.

12. The apparatus of claim 1, wherein the first plurality of local model update elements of the present round include a first plurality of gradient elements of the present round or a first plurality of updated local model parameters of the present round, and the second plurality of local model update elements of the present round include a second plurality of gradient elements of the present round or a second plurality of updated local model parameters of the present round.

13. The apparatus of claim 1, further comprising a transceiver coupled to the at least one processor.

14. A method of wireless communication at a user equipment (UE), comprising:
identifying, in each round other than an initial round, a first plurality of local model update elements of a present round, the first plurality of local model update elements of the present round being associated with an updated local machine learning model, the updated local machine learning model having been generated based on a global machine learning model received from a base station and a local dataset; and
transmitting, in each round other than the initial round, to the base station over a multiple access channel via analog signaling, a second plurality of local model update elements of the present round based on a third plurality of local model update elements of the present round, the third plurality of local model update elements of the present round corresponding to a sum of the first plurality of local model update elements of the present round and a local model update error of a previous round immediately before the present round, the analog signaling being associated with over-the-air (OTA) aggregation.

15. The method of claim 14, wherein the local model update error of the previous round corresponds to a difference between a transmitted second plurality of local model update elements of the previous round and a third plurality of local model update elements of the previous round.

16. An apparatus for wireless communication at a base station, comprising:
a memory; and
at least one processor coupled to the memory and configured to:
receive, in each round other than an initial round, from at least one user equipment (UE) over a multiple access channel via analog signaling, a second plurality of local model update elements of a present round based on a third plurality of local model update elements of the present round, the third plurality of local model update elements of the present round corresponding to a sum of a first plurality of local model update elements of the present round and a local model update error of a previous round immediately before the present round, the first plurality of local model update elements of the present round being associated with an updated local machine learning model, the updated local machine learning model being based on a global machine learning model from the base station and a local dataset of the at least one UE, the analog signaling being associated with over-the-air (OTA) aggregation; and
update, in each round other than the initial round, the global machine learning model based on the received second plurality of local model update elements of the present round.

17. The apparatus of claim 16, wherein the local model update error of the previous round corresponds to a difference between a second plurality of local model update elements of the previous round and a third plurality of local model update elements of the previous round.

18. The apparatus of claim 17, wherein the local model update error of the previous round is associated with, in the previous round, at least one of model compression, truncated channel inversion, or rank deficiency.

19. The apparatus of claim 16, wherein the local model update error of the previous round corresponds to a difference between a decoding result at the base station of a second plurality of local model update elements of the previous round and a third plurality of local model update elements of the previous round.

20. The apparatus of claim 19, wherein the decoding result at the base station of the second plurality of local model update elements of the previous round is zero when the base station failed to decode the second plurality of local model update elements of the previous round.

21. The apparatus of claim 16, wherein a local model update error of the present round corresponds to a difference between the second plurality of local model update elements of the present round and the third plurality of local model update elements of the present round.

22. The apparatus of claim 16, wherein the local model update error of the present round corresponds to a difference between a decoding result at the base station of the second plurality of local model update elements of the present round and the third plurality of local model update elements of the present round.

23. The apparatus of claim 16, the at least one processor being further configured to:
receive, in the initial round, from the at least one UE over the multiple access channel via analog signaling, a second plurality of local model update elements of the initial round based on a first plurality of local model update elements of the initial round.

24. The apparatus of claim 16, the at least one processor being further configured to:
transmit, to the at least one UE, an indication associated with local model update accumulation.

25. The apparatus of claim 24, wherein the indication associated with local model update accumulation is further associated with at least one of model compression, the OTA aggregation, truncated channel inversion, or rank deficiency.

26. The apparatus of claim 16, wherein the first plurality of local model update elements of the present round include a first plurality of gradient elements of the present round or a first plurality of updated local model parameters of the present round, and the second plurality of local model update elements of the present round include a second plurality of gradient elements of the present round or a second plurality of updated local model parameters of the present round.

27. The apparatus of claim 16, further comprising a transceiver coupled to the at least one processor.

28. A method of wireless communication at a base station, comprising:
   receiving, in each round other than an initial round, from at least one user equipment (UE) over a multiple access channel via analog signaling, a second plurality of local model update elements of a present round based on a third plurality of local model update elements of the present round, the third plurality of local model update elements of the present round corresponding to a sum of a first plurality of local model update elements of the present round and a local model update error of a previous round immediately before the present round, the first plurality of local model update elements of the present round being associated with an updated local machine learning model, the updated local machine learning model being based on a global machine learning model from the base station and a local dataset of the at least one UE, the analog signaling being associated with over-the-air (OTA) aggregation; and
   updating, in each round other than the initial round, the global machine learning model based on the received second plurality of local model update elements of the present round.

29. The method of claim 28, wherein the local model update error of the previous round corresponds to a difference between a second plurality of local model update elements of the previous round and a third plurality of local model update elements of the previous round.

30. The method of claim 29, wherein the local model update error of the previous round is associated with, in the previous round, at least one of model compression, truncated channel inversion, or rank deficiency.

\* \* \* \* \*